United States Patent
Kawakami (10) Patent No.: US 11,486,867 B2
(45) Date of Patent: Nov. 1, 2022

(54) ANALYSIS DEVICE

(71) Applicant: Shimadzu Corporation, Kyoto (JP)

(72) Inventor: Kazuya Kawakami, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 369 days.

(21) Appl. No.: 16/856,794

(22) Filed: Apr. 23, 2020

(65) Prior Publication Data
US 2020/0393428 A1    Dec. 17, 2020

(30) Foreign Application Priority Data

Jun. 17, 2019   (JP) .............................. JP2019-112032

(51) Int. Cl.
*G01N 30/86*   (2006.01)

(52) U.S. Cl.
CPC ..... *G01N 30/8672* (2013.01); *G01N 30/8651* (2013.01); *G01N 30/8696* (2013.01)

(58) Field of Classification Search
CPC ........... G01N 30/8672; G01N 30/8651; G01N 30/8696; G01N 30/86
See application file for complete search history.

(56) References Cited

U.S. PATENT DOCUMENTS

2018/0093201 A1   4/2018   Yokoi et al.

FOREIGN PATENT DOCUMENTS

JP         3769904 B2 *   4/2006
WO      2016157517 A1    10/2016

* cited by examiner

*Primary Examiner* — Jennifer Wecker
*Assistant Examiner* — Michael Paul Shimek
(74) *Attorney, Agent, or Firm* — Muir Patent Law, PLLC (57) ABSTRACT

An analysis device includes a main control circuit, a sub-control circuit, a backup execution part, and a restoration execution part. The main control circuit has a calibration information storage area for storing calibration information unique to the analysis device, and is configured to perform operation control unique to the analysis device using the calibration information. The sub-control circuit is communicable with the main control circuit and has a backup information storage area for storing the same information as the calibration information in the calibration information storage area. The backup execution part is configured to execute backup for storing information same as the calibration information stored in the calibration information storage area in the backup information storage area. The restoration execution part executes restoration for restoring the calibration information in the calibration information storage area based on the backup information stored in the backup information storage area of the sub-control circuit.

9 Claims, 5 Drawing Sheets

ANALYSIS DEVICE

BACKGROUND OF THE INVENTION

1. Field of the Invention

The present invention relates to an analysis device that realizes some functions of an analysis system such as a liquid chromatography analysis system.

2. Description of the Related Art

A modular analysis system configured by combining a plurality of analysis devices (modules) is known (see WO 2016/157517 A1). A liquid chromatography analysis system (hereinafter, referred to as an LC system), which is a typical modular analysis system, includes analysis devices such as a liquid delivery device, an autosampler, a column oven, and a detector.

Each analysis device constituting the analysis system independently has a control circuit in which a CPU and the like are incorporated. Further, each analysis device has unique calibration information. The calibration information is a value determined through various adjustment and validation steps in the manufacturing stage of each analysis device, and is essential information for each analysis device to accurately operate and exhibit performance. For example, in the case of a liquid delivery device, information relating to the correlation between the operation speed of a pump driving motor and a liquid delivery flow rate corresponds to the calibration information, and, in the case of an autosampler, information relating to the correlation between the motor rotation speed for driving a needle and a movement distance of the needle corresponds to the calibration information. The calibration information is stored in a storage area provided in a control circuit of each analysis device.

SUMMARY OF THE INVENTION

A control circuit of an analysis device may be damaged due to overvoltage, overcurrent, heat generation, or the like. When the control circuit is damaged, the calibration information stored in the storage area of the control circuit cannot be read, and the calibration information is lost.

Therefore, an object of the present invention is to prevent the loss of unique calibration information held in a control circuit of an analysis device.

The present invention is an analysis device that realizes some functions of an analysis system. The analysis device includes a main control circuit for controlling operation specific to the analysis device, for example, controlling driving of a pump, a heater, and a valve, and a sub-control circuit mounted on a sub-device such as an operation panel. The sub-control circuit is a control circuit for controlling general-purpose operation such as signal processing of an operation button on the operation panel and displaying information on a display provided on the operation panel. In a conventional analysis device, calibration information unique to the analysis device is held only in the main control circuit. However, in the present invention, the calibration information is also held in the sub-control circuit, so that loss of the calibration information is prevented when the main control circuit is damaged.

That is, the analysis device according to the present invention includes the main control circuit, the sub-control circuit, a backup execution part, and a restoration execution part. The main control circuit has a calibration information storage area for storing calibration information unique to the analysis device, and is configured to perform operation control unique to the analysis device using the calibration information. The sub-control circuit is communicable with the main control circuit, has a backup information storage area for storing the same information as the calibration information in the calibration information storage area as backup information, and performs general-purpose operation control of the analysis device. Then, the backup execution part is configured to execute backup for storing the backup information, which is the same information as the calibration information stored in the calibration information storage area, in the backup information storage area. Furthermore, the restoration execution part is configured to execute restoration for restoring the calibration information in the calibration information storage area based on the backup information stored in the backup information storage area of the sub-control circuit.

The sub-device such as an operation panel is of general purpose, and a combination of the analysis device and the sub device, that is, the main control circuit and the sub-control circuit may be different from the original combination. If backup is executed in a case where a combination of the main control circuit and the sub-control circuit is different from the original combination, the backup information stored in the backup information storage area of the sub-control circuit is rewritten, and backup information that should be stored may be lost. Further, if restoration is executed in a case where a combination of the main control circuit and the sub-control circuit is different from the original combination, the unique calibration information stored in the main control circuit is replaced with the unique calibration information of another analysis device, and there is concern that the analysis device cannot exert its original function.

In view of the above, according to an embodiment of the present invention, the sub-control circuit has a first identification information storage area for storing identification information, and the main control circuit has a second identification information storage area that stores the identification information of the sub-control circuit that stores the backup information in the backup information storage area by the backup. This allows the main control circuit to hold the same identification information as the identification information of the sub-control circuit that stores the backup information, so that the main control circuit and the sub-control circuit are associated with each other.

In the above embodiment, the backup execution part may be configured to execute the backup when a preset backup time comes in a state where identification information stored in the second identification information storage area of the main control circuit matches with identification information stored in the first identification information storage area of the sub-control circuit. In this manner, when a preset backup time comes, backup (hereinafter, automatic backup) is automatically executed, so that the calibration information of the main control circuit can be protected.

Note that the backup may be executed when the user inputs a command to execute the backup to the apparatus. Such manual backup can be performed, for example, in a case where both the main control circuit and the sub-control circuit are brand new. That is, in a case where a command to execute the backup is input, the backup execution part is configured to execute the backup when identification information stored in the second identification information storage area of the main control circuit is predetermined initial information, and the backup information is not stored in the backup information storage area of the sub-control circuit. The initial information in the second identification information storage area of the main control circuit is replaced with the identification number of the sub-control circuit storing the backup information when the backup is executed.

Further, when the main control circuit is replaced with a brand-new one, it is desirable that the latest information held in the sub-control circuit can be restored in the main control circuit. On the other hand, in a case where the sub-control circuit is brand new, no backup information is stored in the backup information storage area of the sub-control circuit. If restoration is executed in such a state, the calibration information stored in the calibration information storage area of the main control circuit will be lost. In view of the above, according to an aspect of the embodiment of the analysis device of the present invention, in a case where a command to execute the restoration is input, the restoration execution part is configured to execute the restoration when the backup information is stored in the backup information storage area of the sub-control circuit, and cancel the restoration when the backup information is not stored in the backup information storage area.

In the above case, in a case where the backup information is stored in the backup information storage area of the sub-control circuit, the restoration execution part may be configured to perform version determination of the backup information when a command to execute the restoration is input, and execute the restoration when the backup information indicates a predetermined version as a result of the version determination.

In the above case, furthermore, the restoration execution part may be configured to check with the user whether or not to forcibly execute the restoration when the version of the backup information is not a predetermined version as a result of the version determination, and execute the restoration only in a case where the user inputs a command to forcibly execute the restoration.

Further, when the sub-control circuit fails, the sub-control circuit is replaced with the brand-new sub-control circuit. In such a case, the identification information of the main control circuit and the identification information of the sub-control circuit do not match with each other, and it is not preferable that backup cannot be performed. In view of the above, in a case where a command to execute the backup is input, the backup executing part may be configured to execute the backup when identification information other than predetermined initial information is stored in the second identification information storage area of the main control circuit. In this case, the initial information in the second identification information storage area of the main control circuit is replaced with the identification number of the sub-control circuit storing the backup information when the backup is executed.

Further, when the main control circuit fails, the main control circuit is replaced with the brand-new main control circuit. When backup is executed after replacement with the brand-new main control circuit, the latest backup information stored in the backup information storage area of the sub-control circuit is lost. In order to prevent the above situation, in a case where a command to execute the backup is input, the backup execution part is configured to cancel the backup when identification information stored in the second identification information storage area of the main control circuit is predetermined initial information, and the backup information is stored in the backup information storage area of the sub-control circuit.

Further, when the main control circuit is replaced with a brand-new one, it is desirable that the latest information held in the sub-control circuit can be restored in the main control circuit. In view of the above, in a case where a command to execute the restoration is input, the restoration execution part may be configured to execute the restoration when the backup information is stored in the backup information storage area of the sub-control circuit.

In the analysis device according to the present invention, the calibration information stored in the calibration information storage area of the main control circuit is stored as backup information in the backup information storage area of the sub-control circuit, and the calibration information can be restored in the calibration information storage area of the main control circuit based on the backup information of the sub-control circuit. Accordingly, loss of the calibration information can be prevented even in a case where the main control circuit is damaged.

DETAILED DESCRIPTION OF THE INVENTION

Hereinafter, an embodiment of an analysis device according to the present invention will be described with reference to the accompanying drawings.

First, an example of an analysis system including a plurality of analysis devices will be described with reference to FIG. 1.

Figure 1:
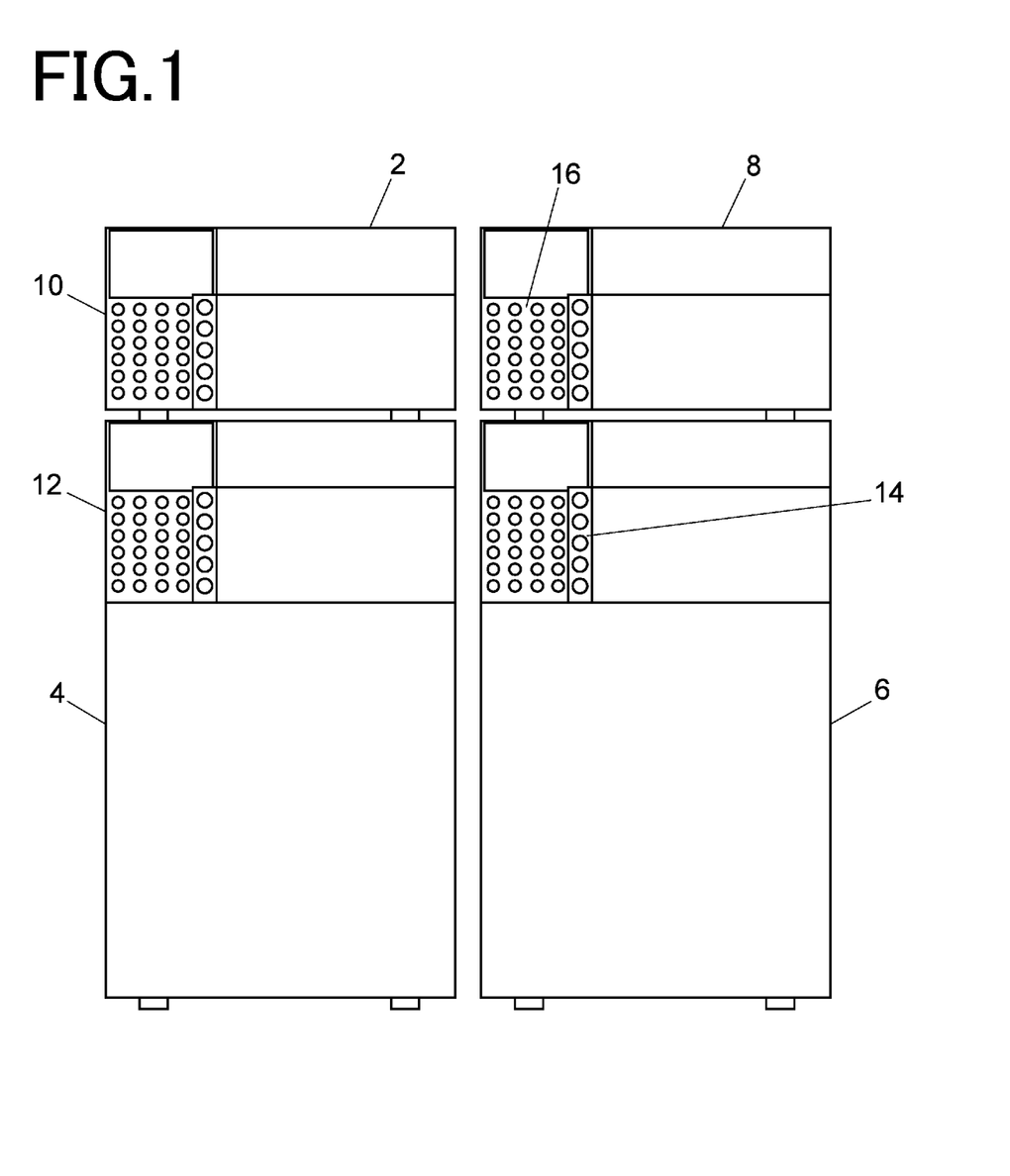
FIG. 1 is a schematic configuration diagram illustrating an example of an analysis system including a plurality of analysis devices.

The analysis system in FIG. 1 is a liquid chromatography analysis system, and includes a liquid delivery device 2, an autosampler 4, a column oven 6, and a detector 8 as analysis devices. The analysis devices 2, 4, 6, and 8 include operation panels 10, 12, 14, and 16 as sub-devices, respectively.

The liquid delivery device 2 includes a liquid delivery pump for delivering a mobile phase and a main control circuit for controlling the operation of the liquid delivery pump.

The autosampler 4 is connected to the liquid delivery device 2 via a pipe, and a mobile phase delivered by the liquid delivery pump of the liquid delivery device 2 is supplied to the autosampler 4. The autosampler 4 performs operation of injecting a sample into a channel through which the mobile phase from the liquid delivery device 2 flows, and includes a sampling needle, a switching valve for switching a connection state of the channel, and a main control circuit for controlling operation of the needle and the operation of the switching valve.

The column oven 6 has temperature control space for accommodating a separation column, and has a function of adjusting a temperature in the temperature control space to a set temperature. The separation column in the column oven 6 is connected to the autosampler 4 via a pipe, and a sample injected by the autosampler 4 is introduced into the separation column together with the mobile phase. The column oven 6 includes a heater and a fan for controlling the temperature in the temperature control space, a temperature sensor for detecting the temperature in the temperature control space, and a main control circuit for controlling the operation of the heater and the fan.

The detector 8 is, for example, an absorbance detector or a differential refractive index detector, and is connected to the downstream side of the separation column in the column oven 6 via a pipe. An eluate from the separation column is introduced into the detector 8 and detected. The detector 8 includes a sample cell in which the eluate from the separation column in the column oven 6 flows, a light source that irradiates the sample cell with light, and a light-receiving element that detects light passing through the sample cell, as well as a main control circuit for performing operation control of the light source and signal processing of the light-receiving element.

In addition, although not shown in FIG. 1, the liquid chromatography analysis system may include a system controller that comprehensively manages the operation of each of the analysis devices 2, 4, 6, and 8.

Figure 2:
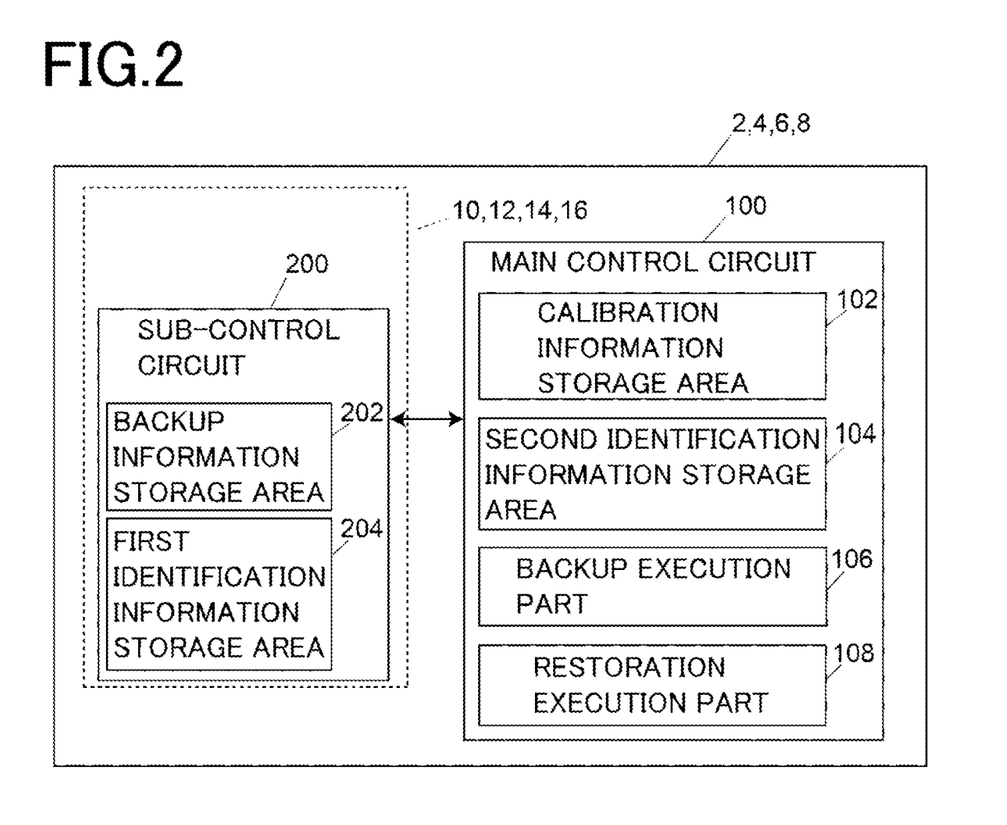
FIG. 2 is a schematic configuration diagram showing one embodiment of the analysis device.

The configuration of each of the analysis devices 2, 4, 6, and 8 will be described with reference to FIG. 2.

Each of the analysis devices 2, 4, 6, and 8 includes a main control circuit 100 and a sub-control circuit 200. The sub-control circuit 200 is mounted on the operation panels 10, 12, 14, and 16, which are sub-devices of the analysis devices 2, 4, 6, and 8, and can communicate with the main control circuit 100.

The main control circuit 100 includes a calibration information storage area 102, a second identification information storage area 104, a backup execution part 106, and a restoration execution part 108. The calibration information storage area 102 and the second identification information storage area 104 are realized by a partial storage area of a nonvolatile memory mounted on the main control circuit 100. The backup execution part 106 and the restoration execution part 108 are functions obtained by a predetermined program executed by an arithmetic element such as a CPU.

The sub-control circuit 200 is for controlling general-purpose operation related to signal processing relating to an operation button on the operation panels 10, 12, 14, and 16 and information display on a display. The sub-control circuit 200 includes a backup information storage area 202 and a first identification information storage area 204. The backup information storage area 202 and the first identification information storage area 204 are realized by a partial storage area of a nonvolatile memory mounted on the sub-control circuit 200.

The calibration information storage area 102 of the main control circuit 100 stores calibration information of each of the analysis devices 2, 4, 6, and 8. The calibration information stored in the calibration information storage area 102 is unique information necessary for accurate operation of each of the analysis devices 2, 4, 6, and 8. The analysis devices 2, 4, 6, and 8 have individual differences even between devices of the same type. Accordingly, for example, even the same liquid delivery devices have different calibration information.

In the initial state, predetermined initial information is stored in the second identification information storage area 104 of the main control circuit 100, and when backup, described later, is executed, the information in the second identification information storage area 104 is replaced with unique identification information of the sub-control circuit 200, for example, an ID number. The identification information of the sub-control circuit 200 is stored in the first identification information storage area 204. In this manner, the main control circuit 100 and the sub-control circuit 200 are associated with each other.

The backup execution part 106 is configured to automatically execute "backup", in which calibration information stored in the calibration information storage area 102 is stored as backup information in the backup information storage area 202 of the sub-control circuit 200, when the user inputs a command to execute backup or when a preset backup time comes. Hereinafter, backup executed when a command from the user is input will be referred to as "manual backup", and backup automatically executed when a preset backup time comes will be referred to as "automatic backup".

In a case where a command for manual backup is input, the backup execution part 106 determines whether the backup is executable or not based on the identification information stored in the second identification information storage area 104 of the main control circuit 100 and the identification information stored in the first identification information storage area 204 of the sub-control circuit 200, and executes the backup if the backup is executable.

In a case where the main control circuit 100 is brand new, the predetermined initial information is stored in the second identification information storage area 104. Accordingly, the backup execution part 106 can determine whether or not the main control circuit 100 is brand new based on the identification information stored in the second identification information storage area 104. In a case where the main control circuit 100 is brand new, it is considered that either the analysis device itself is brand new or the main control circuit 100 has been replaced with a brand-new one. Whether the analysis device itself is brand new or the main control circuit 100 is replaced with a brand-new one can be determined by whether or not backup information is stored in the backup information storage area 202 of the sub-control circuit 200. If the backup information is not stored in the backup information storage area 202 of the sub-control circuit 200, the analysis device itself can be considered as brand new.

The backup execution part 106 is configured to execute backup in a case where both the main control circuit 100 and the sub-control circuit 200 are brand new. When the backup is performed, information in the second identification information storage area 104 of the main control circuit 100 is replaced with the identification information of the sub-control circuit 200, and the main control circuit 100 and the sub-control circuit 200 are associated with each other.

On the other hand, in a case where the main control circuit 100 is brand new, but the sub-control circuit 200 is not brand new, that is, predetermined initial information is stored in the second identification information storage area 104 of the main control circuit 100, and backup information is stored in the backup information storage area 202 of the control circuit 200, when the backup is executed, the backup information held in the sub-control circuit 200 disappears. For this reason, in the present embodiment, in a case where the main control circuit 100 is brand new and the sub-control circuit 200 is not brand new, the backup execution part 106 is configured not to execute the backup even if the user inputs a command to execute the backup. In that case, some warning may be given to the user.

Further, in a case where the main control circuit 100 is not brand new, the backup execution part 106 is configured to compare the identification information stored in the second identification information storage area 104 of the main control circuit 100 with the identification information of the sub-control circuit 200, and execute the backup if these pieces of identification information match with each other.

Further, after the manual backup is executed at least once, and when the backup time (for example, every 24 hours) is set, the backup execution part 106 is configured to automatically execute backup when and the backup time comes.

When the user inputs a command to execute restoration, the restoration execution part 108 is configured to execute "restoration", in which the backup information stored in the sub-control circuit 200 is used to restore the calibration information unique to the analysis devices 2, 4, 6, and 8 to the calibration information storage area 102. However, if restoration is executed in a case where the sub-control circuit 200 is brand new, the information in the calibration information storage area 102 of the main control circuit 100 will be erased. For this reason, in the present embodiment, the restoration execution part 108 is configured not to execute (to cancel) the restoration in a case where the sub-control circuit 200 is brand new.

Figure 3:
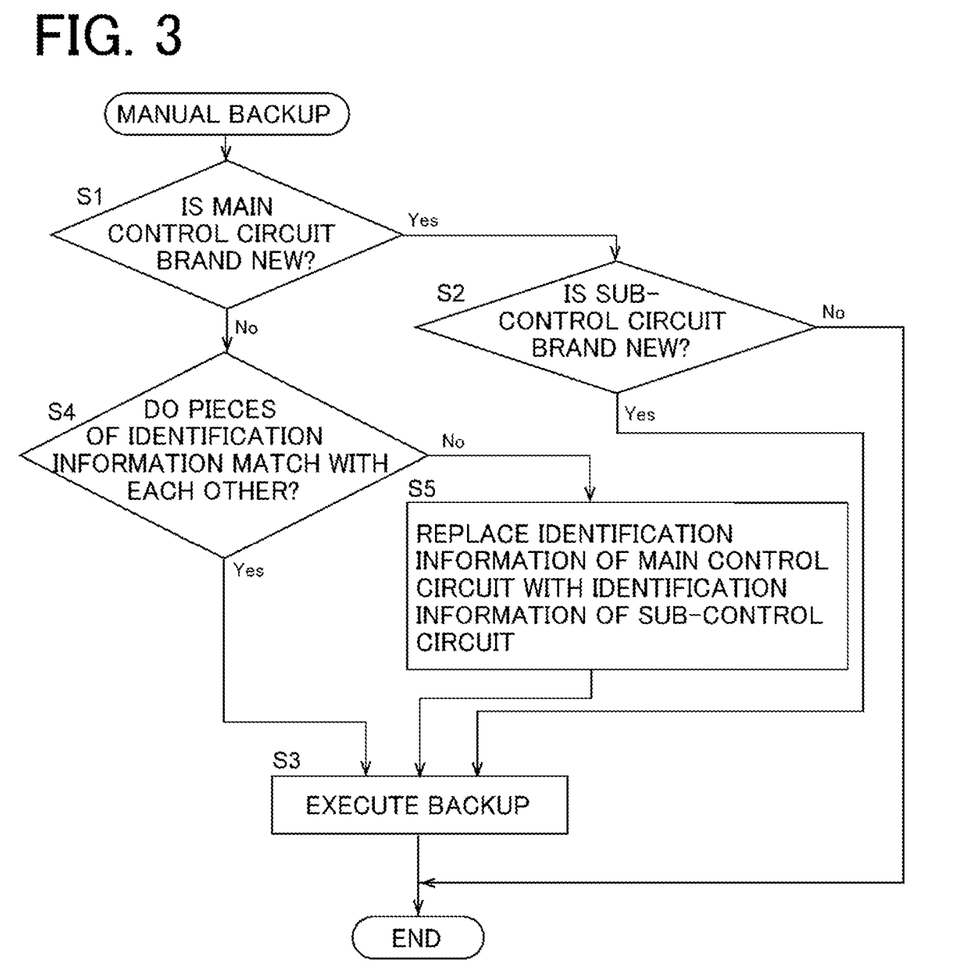
FIG. 3 is a flowchart for explaining manual backup operation of the embodiment.

An example of the backup operation in the embodiment will be described with reference to the flowchart of FIG. 3 together with FIG. 2.

In a case where a command to execute backup is input by the user, the backup execution part 106 determines whether or not the main control circuit 100 is brand new based on the identification information stored in the second identification information storage area 104 of the main control circuit 100 (Step S1). In a case where the main control circuit 100 is brand new, whether or not the sub-control circuit 200 is brand new is determined based on the presence or absence of backup information in the backup information storage area 202 of the sub-control circuit 200 (Step S2). In a case where the sub-control circuit 200 is brand new, the backup execution part 106 executes backup (Step S3). By this backup, the information in the second identification information storage area 104 of the main control circuit 100 is replaced with the identification information stored in the first identification information storage area 204 of the sub-control circuit 200, and the main control circuit 100 and the sub-control circuit 200 are associated with each other. On the other hand, in a case where the main control circuit 100 is brand new and the sub-control circuit 200 is not brand new (Steps S1 and S2), the backup execution part 106 ends the manual backup function without executing backup.

In a case where the main control circuit 100 is not brand new, (Step S1), the backup is executed regardless of whether or not the identification information stored in the second identification information storage area 104 of the main control circuit 100 matches with the identification information of the sub-control circuit 200 (Step S3). In a case where the identification information stored in the second identification information storage area 104 of the main control circuit 100 does not match with the identification information of the sub-control circuit 200 (Step S4), the identification information of the second identification information storage area 104 of the main control circuit 100 is replaced with the identification information of the sub-control circuit 200 (Step S5).

Here, the information stored in the calibration information storage area 102 of the main control circuit 100 has a version (hereinafter, data version), and is updated if necessary (for example, when the firmware of the main control circuit 100 is updated, or the like). In a case where the backup is executed by the above backup operation, the data version information is stored in the backup information storage area 202 of the sub-control circuit 200 together with the information stored in the calibration information storage area 102 of the main control circuit 100. The data version of the calibration information of the main control circuit 100 and the data version of the backup information storage area 202 of the sub-control circuit 200 are used to determine whether or not the restoration is forcibly executed in restoration operation described below.

Figure 4:
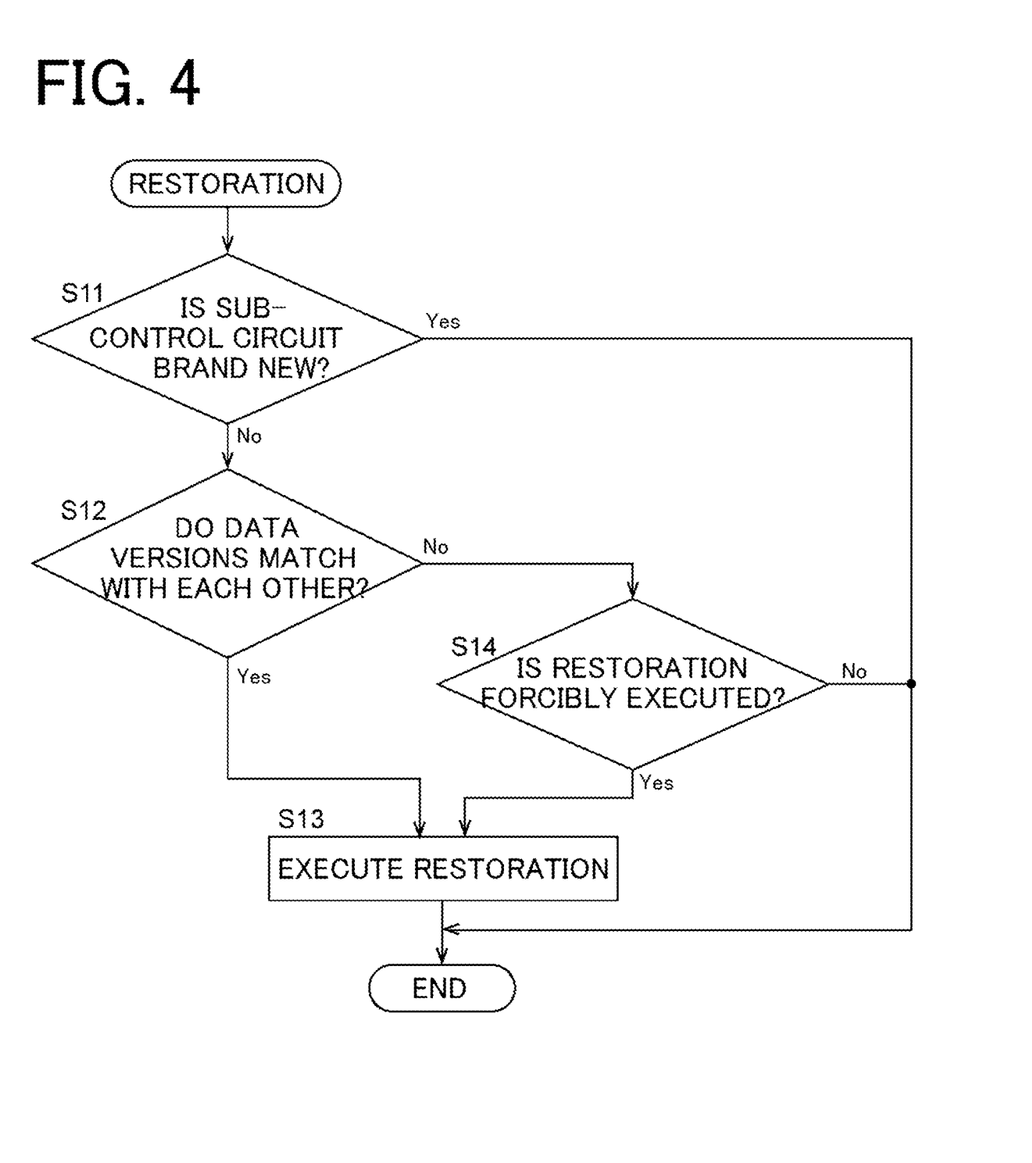
FIG. 4 is a flowchart for explaining restoration operation of the embodiment.

Next, an example of the restoration operation in the embodiment will be described with reference to the flowchart of FIG. 4 together with FIG. 2.

In a case where a command to execute restoration is input by the user, the restoration execution part 108 determines whether or not the sub-control circuit 200 is brand new (Step S1). In a case where the sub-control circuit 200 is brand new, the restoration execution part 108 ends the restoration function without executing the restoration. In a case where the sub-control circuit 200 is not brand new, the restoration execution part 108 determines the version of the backup information stored in the backup information storage area 202 of the sub-control circuit 200, and determines whether or not the data version matches with the data version of the information stored in the calibration information storage area 102 of the main control circuit 100 (Step S12). If the data versions match with each other, the restoration is executed (Step S13). In a case where the data versions of the information of the main control circuit 100 and the sub-control circuit 200 do not match with each other (Step S12), the user is allowed to determine whether or not to forcibly execute the restoration, and the restoration is executed only in a case where the user desires so (Steps S14 and S13). In a case where the user does not desire the forced restoration (Step S14), the restoration function ends without executing the restoration.

Figure 5:
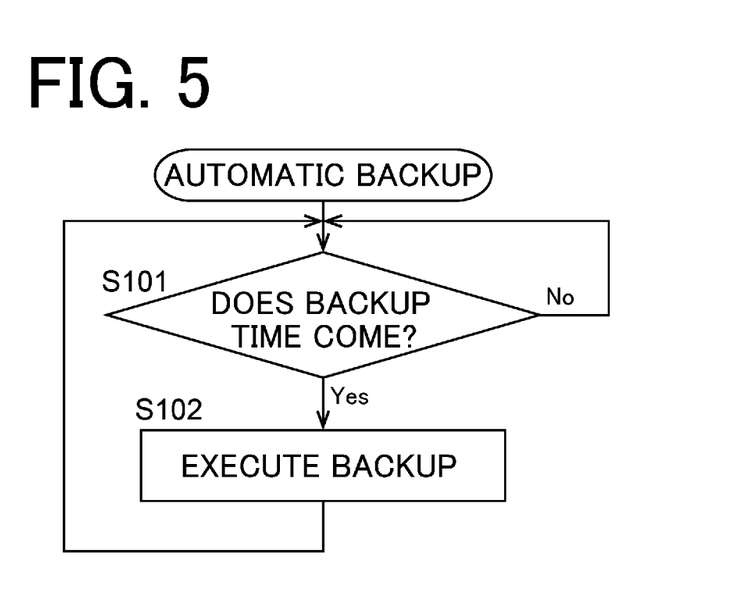
FIG. 5 is a flowchart for explaining automatic backup operation of the embodiment.

Further, as shown in FIG. 5, in a case where the automatic backup is set by the user, the backup execution part 106 automatically executes the backup when the set backup time comes (Steps S101 and S102).

Note that, in the embodiment described above, the sub-control circuit 200 has unique identification information, and the identification information of the sub-control circuit 200 is stored in the main control circuit 100, so that the main control circuit 100 and the sub-control circuit 200 are associated with each other. However, the present invention is not limited to this, and the configuration may be such that the main control circuit 100 has unique identification information, and the identification information of the main control circuit 100 is stored in the sub-control circuit 200, so that the main control circuit 100 and the sub-control circuit 200 are associated with each other.

DESCRIPTION OF REFERENCE SIGNS 2, 4, 6, 8: Analysis device
10, 12, 14, 16: Sub-device (operation panel)
100: Main control circuit
102: Calibration information storage area
104: Second identification information storage area
106: Backup execution part
108: Restoration execution part
200: Sub-control circuit
202: Backup information storage area
204: First identification information storage area

What is claimed is:
1. An analysis device that realizes some functions of an analysis system, comprising:
a main control circuit that has a calibration information storage area for storing calibration information unique to the analysis device, and is configured to perform operation control unique to the analysis device using the calibration information;

a sub-control circuit that is configured to perform general-purpose operation control of the analysis device, is communicable with the main control circuit, and has a backup information storage area for storing backup information which is the same as the calibration information stored in the calibration information storage area;

a backup execution part that is configured to execute backup for storing the backup information, which is the same as the calibration information stored in the calibration information storage area, in the backup information storage area; and a restoration execution part that is configured to execute restoration for restoring the calibration information in the calibration information storage area based on the backup information stored in the backup information storage area of the sub-control circuit.

2. The analysis device according to claim 1, wherein
the sub-control circuit has a first identification information storage area for storing identification information of the sub-control circuit, and
the main control circuit has a second identification information storage area that stores the identification information of the sub-control circuit that stores, as a result of the backup, the backup information in the backup information storage area.

3. The analysis device according to claim 2, wherein the backup execution part is configured to execute the backup when a preset backup time comes in a state where identification information stored in the second identification information storage area of the main control circuit matches with identification information stored in the first identification information storage area of the sub-control circuit.

4. The analysis device according to claim 2, wherein in a case where a command to execute the backup is input, the backup execution part is configured to execute the backup when identification information stored in the second identification information storage area of the main control circuit is predetermined initial information, and the backup information is not stored in the backup information storage area of the sub-control circuit.

5. The analysis device according to claim 2, wherein in a case where a command to execute the restoration is input, the restoration execution part is configured to execute the restoration when the backup information is stored in the backup information storage area of the sub-control circuit, and cancel the restoration when the backup information is not stored in the backup information storage area.

6. The analysis device according to claim 5, wherein in a case where the backup information is stored in the backup information storage area of the sub-control circuit, the restoration execution part is configured to perform version determination of the backup information when a command to execute the restoration is input, and execute the restoration when the backup information indicates a predetermined version as a result of the version determination.

7. The analysis device according to claim 6, wherein the restoration execution part is configured to check with a user whether or not to forcibly execute the restoration when a version of the backup information is not a predetermined version as a result of the version determination, and execute the restoration only in a case where the user inputs a command to forcibly execute the restoration.

8. The analysis device of claim 2, wherein in a case where a command to execute the backup is input, the backup executing part is configured to execute the backup when identification information other than predetermined initial information is stored in the second identification information storage area of the main control circuit.

9. The analysis device according to claim 2, wherein in a case where a command to execute the backup is input, the backup execution part is configured to cancel the backup when identification information stored in the second identification information storage area of the main control circuit is predetermined initial information, and the backup information is stored in the backup information storage area of the sub-control circuit.

* * * * *